(12) United States Patent
Lapergue et al.

(10) Patent No.: US 7,213,393 B2
(45) Date of Patent: May 8, 2007

(54) DEVICE FOR SUPPLYING COOLING AIR TO EXHAUST NOZZLE FLAPS

(75) Inventors: Guy Lapergue, Rubelles (FR); Raphael Curtelin, Saint-Mery (FR); Didier Feder, Melun (FR)

(73) Assignee: Snecma Moteurs, Paris (FR)

( * ) Notice: Subject to any disclaimer, the term of this patent is extended or adjusted under 35 U.S.C. 154(b) by 214 days.

(21) Appl. No.: 11/025,910

(22) Filed: Jan. 3, 2005

(65) Prior Publication Data

US 2005/0210864 A1  Sep. 29, 2005

(30) Foreign Application Priority Data

Jan. 12, 2004  (FR) .................................. 04 00219

(51) Int. Cl.
*F02K 1/12* (2006.01)
(52) U.S. Cl. ...................... 60/266; 60/771; 239/265.37

(58) Field of Classification Search ................... 60/266, 60/771; 239/265.37, 265.39, 265.41
See application file for complete search history.

(56) References Cited

U.S. PATENT DOCUMENTS

| 5,255,849 A | 10/1993 | Mayer et al. |
| 5,603,531 A | 2/1997 | Maier |
| 5,775,589 A | 7/1998 | Vdoviak et al. |
| 6,301,877 B1 | 10/2001 | Liang et al. |

FOREIGN PATENT DOCUMENTS

DE  337 119  5/1921

*Primary Examiner*—L. J. Casaregola
(74) *Attorney, Agent, or Firm*—Oblon, Spivak, McClelland, Maier & Neustadt, P.C.

(57) ABSTRACT

A device for supplying cooling air to a hollow flap of an exhaust nozzle in a turbojet engine. The device includes a tube connecting the hollow flap to a cooling air source. The tube comprises at least one telescopic portion and at least one ball-joint connection.

19 Claims, 3 Drawing Sheets

Figure 1:
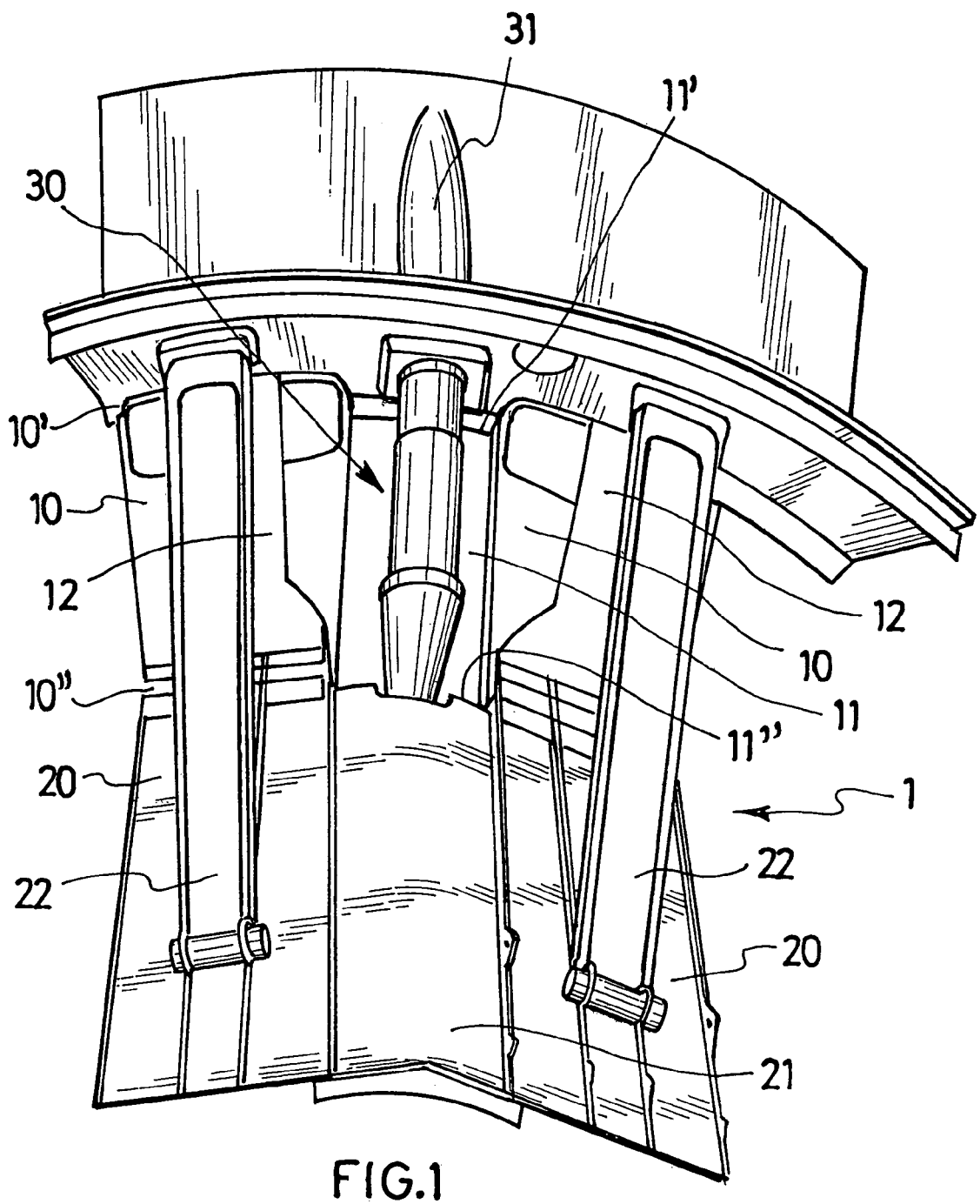

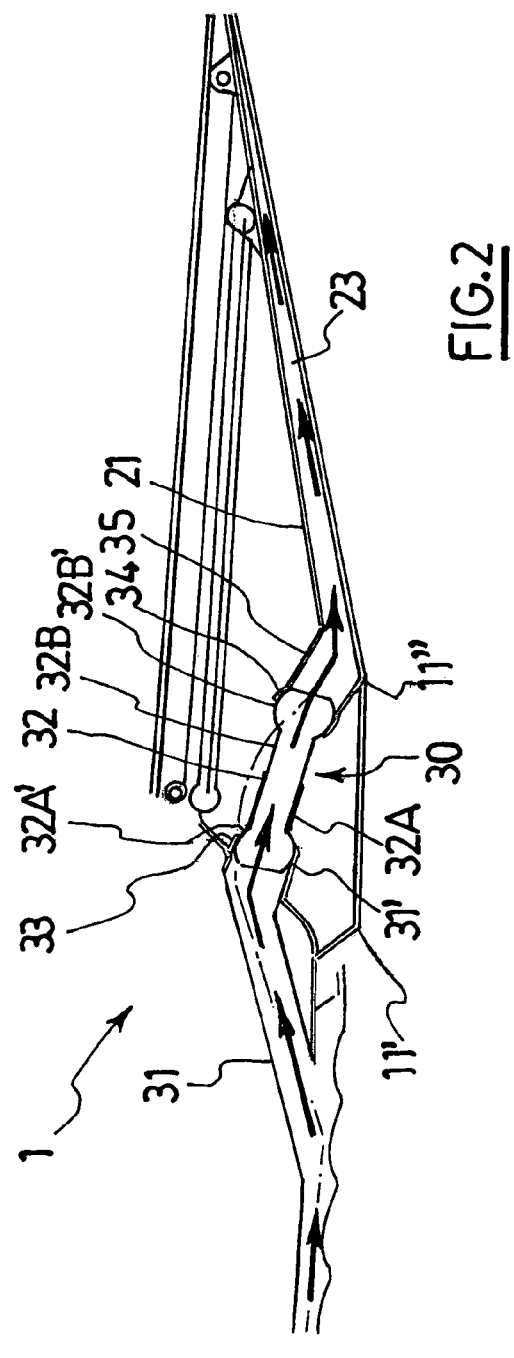
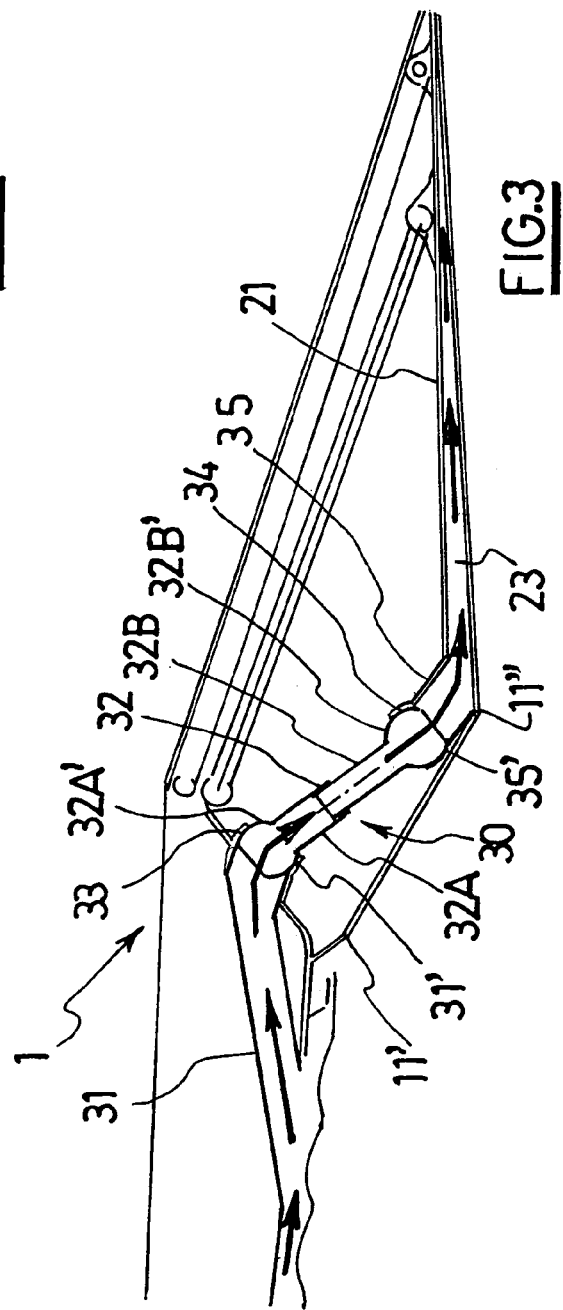

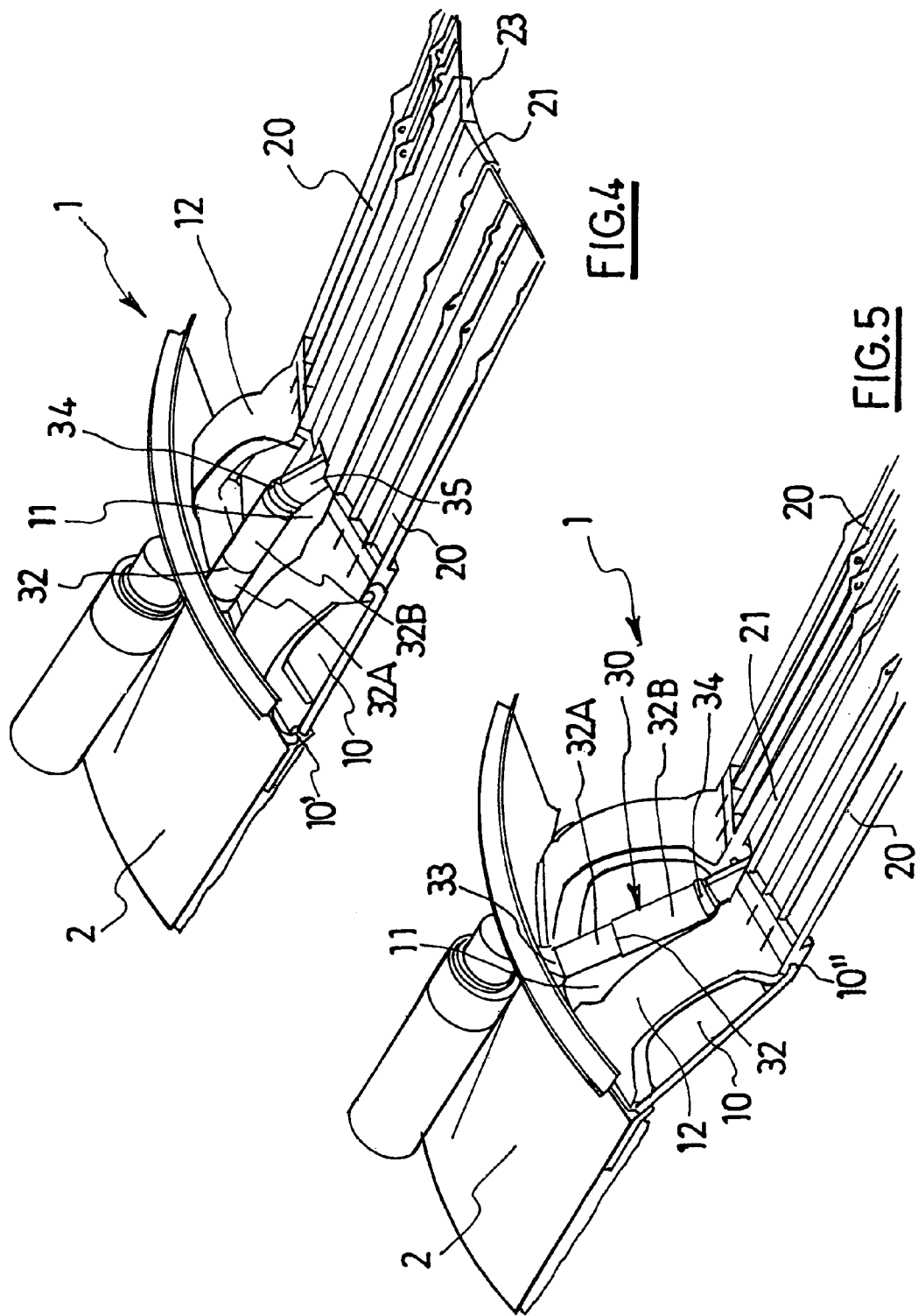

DEVICE FOR SUPPLYING COOLING AIR TO EXHAUST NOZZLE FLAPS

The present invention concerns a device for supplying cooling air to an exhaust nozzle flap in a turbojet engine.

Downstream of its turbine, a turbojet engine comprises an exhaust channel including an exhaust housing and an exhaust nozzle. The role of the exhaust channel is to transform the energy of remaining pressure, on leaving the turbine, into kinetic energy by expansion of the combustion gases.

It is frequent to use a variable section exhaust nozzle so as to adapt its section to engine operation. Variable section exhaust nozzles are used in turbojet engines whether with or without reheat. Reheat, or post-combustion, consists of injecting fuel into the exhaust channel to cause combustion of the gas derived from the turbine which still contains oxygen, thereby increasing the thrust of the turbojet engine.

Variable section exhaust nozzles may be of different types, in particular they may be axisymmetrical, bidimensional or pivotal. The invention applies to all types of exhaust nozzles and more particularly to convergent-divergent axisymmetrical exhaust nozzles, i.e. exhaust nozzles the upstream portion of which is convergent and the downstream portion of which is divergent, for a turbojet engine with post-combustion.

Convergent-divergent axisymmetrical exhaust nozzles are used for supersonic applications, the speed of a supersonic gas increasing in a divergent exhaust nozzle. They consist of a plurality of flaps, arranged in a ring to obtain a globally circular section and which partly overlap one another. One out of every two flaps, called a controlled flap, is actuated by a jack whilst between two controlled flaps is a servo flap driven by the controlled flaps.

During post-combustion, the temperature of the gases may reach approximately 2000° C. Cooling of the exhaust nozzle flaps is therefore needed firstly to increase their lifetime, and secondly to reduce the exhaust nozzle's infrared thermal signature which must be minimal in military applications.

The prior art, in particular documents U.S. Pat. No. 5,255,849 and U.S. Pat. No. 5,775,589 proposes a cooling device by circulation of air along the inner wall of the flaps which are hollow. The air supply to the divergent flaps comprises semi-circular tubes, one projecting outside a flap of the convergent portion of the exhaust nozzle, the other projecting outside a flap of the divergent portion of the exhaust nozzle and being engaged in the first so that the cavities of the flaps concerned communicate. The cooling air, derived from the secondary flow of the turbojet engine is therefore used to cool the convergent flap firstly and then the divergent flap by means of the above-mentioned tubes. The tubes have the same centre and radius of curvature and are therefore able to slide within one another to offset variations in angle between the two portions of the exhaust nozzle when the jacks are actuated.

However, in this cooling device, the cooling air for the divergent flaps is derived from the convergent flaps and has therefore already been used to cool the latter. It would be preferable to supply the divergent flaps directly with cooling air so as to increase efficiency. However, it is not possible to use tubes of the type presented above, one of which projects outwardly from a divergent flap and the other out of a cavity of the engine supplied with secondary flow cooling air, since between a divergent flap and a part of the engine which is not a convergent flap, movement is not mere rotational movement. In addition, the volume area required would be too large in a part of the engine that has confined space.

The present invention sets out to overcome these disadvantages.

For this purpose, the invention concerns a device for supplying cooling air to an exhaust nozzle flap of a turbojet engine, which comprises a tube connecting the flap to a cooling air source, characterized by the fact that the tube comprises at least one telescopic portion and a ball-joint connection.

By ball-joint is meant a mechanical connection only having degrees of freedom in rotation. Preferably, the ball-joint connection comprises three degrees of rotation, but it may optionally be designed to only have one or two.

Preferably, the tube comprises two ball-joint connections and one telescopic portion.

Advantageously, the telescopic portion also acts as a pump.

In particular, the cooling air source comprises a tube, on the periphery of the exhaust channel housing, bringing air from the secondary flow of the turbojet engine.

With the invention, it is possible to achieve easy supply of cooling air to the divergent flaps of the exhaust nozzle with no operating mechanical constraints irrespective of the source to which the flaps are connected.

The supply device also adapts to any type of exhaust nozzle; it is possible in particular to supply cooling air to the flaps of a convergent axisymmetrical exhaust nozzle, the convergent or divergent flaps of a convergent-divergent axisymmetrical exhaust nozzle, the flaps of a bidimensional exhaust nozzle or the flaps of a pivotable exhaust nozzle. The advantages are numerous both regarding the installation of the supply device of the invention and its fabrication, the latter possibly being standardized for all types of exhaust nozzles. In particular, it is also possible with the supply device of the invention to connect the convergent flaps of a convergent-divergent exhaust nozzle to its divergent flaps as in the prior cited art, but in simpler manner since machining of the parts requires lesser precision than in the case in which the centres and curvature radii must be strictly identical to avoid any stresses or friction.

In addition, the tube of the supply device of the invention, on account of its structure, absorbs the stresses of vibrations and expansion related to the operating of the turbojet engine.

The invention will be more readily understood with the following description of a preferred embodiment of the supply device of the invention, with reference to the appended drawings in which:

FIG. 1 is a perspective front view of an exhaust nozzle of a turbojet engine equipped with the preferred embodiment of the supply device of the invention, FIG. 2 is a profile section view of the supply device in FIG. 1, in a first position, FIG. 3 is a profile section view of the supply device in FIG. 2, in a second position, FIG. 4 is a perspective view of the supply device in FIG. 2, and FIG. 5 is a perspective view of the supply device in FIG. 3.

With reference to FIG. 1, the supply device of the invention, in its preferred embodiment, is arranged on an axisymmetrical convergent-divergent exhaust nozzle 1 of a turbojet engine with post-combustion. The exhaust nozzle 1 is mounted on the downstream part of the housing 2 of the exhaust channel of the turbojet engine. The exhaust nozzle 1 comprises convergent flaps, either controlled 10 or servo-controlled 11, and divergent flaps, either controlled 20 or servo-controlled 21.

The convergent flaps 10, 11 are joined, upstream, to the housing 2, by hinges 10', 11' respectively, around which they are able to pivot, each hinge 10', 11' extending along an axis perpendicular to the axis of the exhaust nozzle 1. Downstream they are joined by hinges 10", 11", respectively, to divergent flaps 20, 21. Each downstream hinge 10", 11" is parallel, in the plane of flap 10, 11 to which it belongs, to the corresponding upstream hinge 10', 11'.

The convergent flaps 10, 11 are placed in a ring around the axis of exhaust nozzle 1 so as to form a globally circular section, the controlled flaps 10 and servo flaps 11 being arranged alternately around the circumference of the ring. Each controlled flap 10 is controlled by a rod 12, actuated to cause flap 10 to pivot about the axis of its upstream hinge 10'. When the rods 12 are actuated, the controlled flaps 10 pivot and pivotably drive with them the servo-controlled flaps 11, each servo-controlled flap 11 being surrounded by two controlled flaps 10.

The divergent flaps 20, 21 are also arranged in a ring fashion around the axis of the turbine, and are joined on their upstream side by hinges 10", 11" to the convergent flaps 10, 11. Each controlled divergent flap 20 is connected to a controlled convergent flap 10, and each servo-controlled divergent flap 21 is joined to a servo-controlled convergent flap 11. In the same way as for the ring of convergent flaps, the ring of divergent flaps therefore consists of an alternation of controlled flaps 20 and servo flaps 21.

The controlled divergent flaps 20 are controlled by rods 22 in a manner well known to persons skilled in the art. Each servo-controlled divergent flap 21 being located between two controlled divergent flaps 20, it follows the movement imposed by the controlled flaps 20. The movements of the divergent flaps 20, 21 are not simple pivoting movements but the composition of pivot movement about hinges 10", 11" and of rotational movements about hinges 10', 11'.

In the embodiment of the invention illustrated in the figures, the servo-controlled divergent flaps 21 are hollow, whilst the controlled divergent flaps 20 are solid. Said configuration is chosen since the controlled divergent flaps 20, in relation to the desired section of exhaust nozzle 1, either partly or fully overlap the servo-controlled divergent flaps 21, and it is therefore the cooling of the latter which is determinant. However, if the invention applies here to a tube used for cooling servo-controlled divergent flaps, it evidently also applies to any kind of flaps whether controlled divergent, convergent or other, irrespective of the type of exhaust nozzle or type of flap control. In the case in point, according to a particular embodiment, the controlled divergent flaps 20 are hollow and are supplied with cooling air by rods 12 controlling the controlled convergent flaps 10, each rod then being arranged so as to be hollow, connected in its upstream part to a cooling source and being fixed in its downstream part to a controlled convergent flap 10 to actuate the latter and also leading into the upstream part of a controlled divergent flap 20 to supply it with cooling air.

With reference to FIG. 2, a tube 30 opens into each servo-controlled divergent flap 21. This tube is used to supply cavity 23 arranged in the thickness of flap 21 with cooling air. This air, by means of tube 30 of the invention, may be derived from various upstream parts of the engine, from the compressor for example. A tubing system 31 on the periphery of the turbojet engine makes it possible to guide cooling air from the point where it is taken as far as the edges of exhaust nozzle 1, forming a cooling air source 31 for this nozzle. These sources of cooling air 31 lead into the vicinity of the exhaust nozzle 1, more precisely in this case at right angles with the servo-controlled convergent flaps 11. The air sources 31 are placed in communication with the inner cavities 23 of the servo-controlled divergent flaps 21 by means of tubes 30 which are able to follow all movements of the flaps with respect to tubes 31 which are fixed in relation to housing 2 of the exhaust nozzle 1. These movements are the composition of various elementary movements and are therefore complex.

Here the cooling air source 31, in the vicinity of convergent flaps 10, 11, comprises a separation nozzle making it possible to direct part of the cooling air towards the convergent flaps 10, 11, their cooling simply being ensured by an opening in the vicinity of these flaps 10, 11, through which the air can come to cool the inner surface of these flaps 10, 11, and another part of the air is directed towards tubes 30 leading into the servo-controlled divergent flaps 21.

According to the particular embodiment in which the controlled divergent flaps 20 are supplied with cooling air by rods 12 actuating the controlled convergent flaps 10, these rods 12 also lead upstream into the cooling air source 31, the cooling air at this point being directed firstly towards rods 12 and secondly towards the controlled convergent flaps 10 in the same manner as previously described.

So that they can follow any movement, each tube 30 comprises a telescopic portion 32 and two ball-joint connections 33, 34, one 33 connecting tube 30 to the cooling air source 31 and the other connecting tube 30 to the inner cavity 23 of the servo-controlled divergent flap 21 via a tube portion 35 projecting outside the plane of flap 21. The telescopic portion 32 is located between two ball-joint connexions 33, 34.

The telescopic portion 32 is formed of two tube parts 32A, 32B able to slide within each other at one end. At the other end, each tube part 32A, 32B comprises a head having a portion with a spherical outer surface 32A', 32B'. Head 32A' is inserted in tubular element 31. This element 31 comprises an end portion with a spherical inner surface 31' in which head 32A' is housed. Together portion 31' and the spherical head 32A' form a ball-joint 33. The tube is retained axially but is able to pivot with respect to element 31. Head 32B' is inserted in tubular element 35. This element 35 comprises an end portion with a spherical inner surface 35' in which head 32B' is housed. Together portion 35' and spherical head 32B' form a ball-joint connection 34. The tube is retained axially but is able to pivot with respect to element 35.

In FIG. 3, tube 30 is in another position, subsequent to actuation by rods 12, 22 and therefore to a change in the position of flaps 10, 11, 20, 21. To maintain communication between the cooling air source 31 and the portion of tubular element 35 projecting outside flap 21, tube 30 adapts to the new position of flap 21 with respect to the air source 31, and follows the movement by rotation about the ball-joints 33, 34 and in this case extends its length at telescopic portion 32.

In another embodiment of the invention, the upstream head 32A' takes part, in the same manner as previously, in the formation of a ball-joint with three degrees of freedom and is fitted into the end portion with spherical inner surface 31' of tubular element 31, or tube 31, via the upstream side, thereby being retained axially against it. The downstream head 32B' is made interdependent with the spherical inner surface portion 35' of tubular element 35, or tube 35, integral with divergent flap 21, via a pin transversal to the axis of the turbojet engine extending through the downstream head 32B' and tubular element 35. Therefore the downstream head 32B' is retained axially by this pin and can pivot about it; in this case, the ball-joint connection 34 only has one degree of freedom.

Tube 30 is sized so that the range of lengths over which its telescopic portion 32 may extend and the range of angles which may be taken by ball-joint connections 33, 34 are sufficient to follow all the positions which may be taken by the flaps.

In FIGS. 2 and 3, the arrows illustrate the pathway of the cooling air from the air sources 31 as far as flaps 21.

Evacuation of the cooling air may be made in various manners: the air may, for example, be evacuated via the trailing edge of flaps 21, or via perforations on the hot, or inner, surface of these flaps so as to be directly re-injected into the gas stream. Evacuation is not shown in the figures.

The telescopic portion 32 may be arranged so as to act also as a pump i.e. through the clearance existing between the telescopic tubes it can draw in air so that part of the air outside tube 30 can be carried and mixed with the cooling air circulating in tube 30.

FIGS. 4 and 5 show a perspective view of the two positions in FIGS. 2 and 3. They afford a more clearly visible view of the reasons for which, in the preferred embodiment of the invention, only the servo-controlled divergent flaps are arranged with tubes 30; firstly because when the controlled flaps 20 overlap the servo-controlled flaps 21, the latter form a screen between the controlled flaps and the stream of hot gas, and secondly for reasons of space, it being simpler to arrange tubes 30 above convergent flaps 11 which are not controlled by rods 12.

It is to be recalled however that tubes 30 of the invention may be applied to all types of exhaust nozzle flaps.

The invention claimed is:

1. A device for supplying cooling air comprising:
a turbojet engine exhaust nozzle including a hollow flap;
a source of cooling air; and
a tube connecting said hollow flap to said source of cooling air;
wherein said tube comprises a telescopic portion and one ball-joint connection.

2. A device according to claim 1, wherein the hollow flap is a divergent hollow flap of a convergent-divergent exhaust nozzle.

3. A device according to claim 2, wherein the convergent-divergent exhaust nozzle includes a convergent flap pivotally joined to a housing of the exhaust nozzle and the hollow divergent flap is pivotally joined to said convergent flap.

4. A device according to claim 3, wherein the hollow divergent flap is servo-controlled.

5. A device according to claim 2, wherein the hollow divergent flap is servo-controlled.

6. A device according to claim 1, wherein the tube includes two ball-joint connections.

7. A device according to claim 6, wherein the telescopic portion is located between the two ball-joint connections.

8. A device according to claim 1, wherein the telescopic portion also acts as a pump.

9. A device according to claim 1, wherein the source of cooling air comprises a tube on the periphery of a housing of an exhaust channel of a turbojet engine, bringing air from the secondary flow of the turbojet engine.

10. A turbojet engine comprising:
a variable section exhaust nozzle including a hollow flap;
a source of cooling air; and
a tube connecting said hollow flap to said source of cooling air;
wherein said tube comprises a telescopic portion and one ball-joint connection.

11. A turbojet engine according to claim 10, wherein the exhaust nozzle belongs to one of the following groups of exhaust nozzles: convergent exhaust nozzles, convergent-divergent exhaust nozzles, bidimensional exhaust nozzles, pivotable exhaust nozzles.

12. A device according to claim 10, wherein the hollow flap is a divergent hollow flap of a convergent-divergent exhaust nozzle.

13. A device according to claim 12, wherein the convergent-divergent exhaust nozzle includes a convergent flap pivotally joined to a housing of the exhaust nozzle and the hollow divergent flap is pivotally joined to said convergent flap.

14. A device according to claim 13, wherein the hollow divergent flap is servo-controlled.

15. A device according to claim 12, wherein the hollow divergent flap is servo-controlled.

16. A turbojet engine according to claim 10, wherein the tube includes two ball-joint connections.

17. A turbojet engine according to claim 16, wherein the telescopic portion is located between the two ball-joint connections.

18. A turbojet engine according to claim 10, wherein the telescopic portion also acts as a pump.

19. A turbojet engine according to claim 10, wherein the source of cooling air comprises a tube on the periphery of a housing of an exhaust channel of a turbojet engine, bringing air from the secondary flow of the turbojet engine.

* * * * *